United States Patent [19]

Tsunoda

[11] Patent Number: 5,027,407
[45] Date of Patent: Jun. 25, 1991

[54] PATTERN RECOGNITION APPARATUS USING A PLURALITY OF CANDIDATES

[75] Inventor: Jun Tsunoda, Kawasaki, Japan

[73] Assignee: Kabushiki Kaisha Toshiba, Kawasaki, Japan

[21] Appl. No.: 469,820

[22] Filed: Jan. 23, 1990

Related U.S. Application Data

[63] Continuation of Ser. No. 349,910, May 9, 1989, abandoned, which is a continuation of Ser. No. 158,727, Feb. 22, 1988, abandoned.

[30] Foreign Application Priority Data

Feb. 23, 1987 [JP] Japan .................................. 62-37787

[51] Int. Cl.⁵ .............................................. G10L 7/08
[52] U.S. Cl. ..................................................... 381/43
[58] Field of Search ...................................... 381/41–46; 364/513.5

[56] References Cited

U.S. PATENT DOCUMENTS

| | | | |
|---|---|---|---|
| 3,710,323 | 1/1973 | Andrews et al. | 340/146 |
| 3,943,295 | 3/1976 | Martin et al. | 179/1 |
| 4,412,098 | 10/1983 | An | 381/43 |
| 4,423,291 | 12/1983 | Zwicker et al. | 381/43 |
| 4,516,215 | 5/1985 | Hakaridani | 381/43 |
| 4,567,606 | 1/1986 | Vensko | 381/43 |
| 4,677,673 | 6/1987 | Ukita | 381/43 |

OTHER PUBLICATIONS

Dapron, et al., "A System for Voiced Input of Laboratory Data," 8081 Proceedings of the National Electronics Conference, vol. 34, pp. 346–350, Brook, Illinois, Oct. 1980.

Primary Examiner—Gary V. Harkcom
Assistant Examiner—John A. Merecki
Attorney, Agent, or Firm—Finnegan, Henderson, Farabow, Garrett, and Dunner

[57] ABSTRACT

Voice feature data extracted from an input voice signal are stored in a first memory. Of the stored voice feature data, feature data having a predetermined duration defined by the output from a word boundary detection section are read out by a re-sampling section, and are stored in a second memory. The voice feature data which are normalized along the time base in this manner are supplied to a similarity computing section together with reference pattern data, and a category pattern corresponding to the resultant maximum similarity is determined in a determining section and outputted as a recognition result of the input voice.

15 Claims, 11 Drawing Sheets

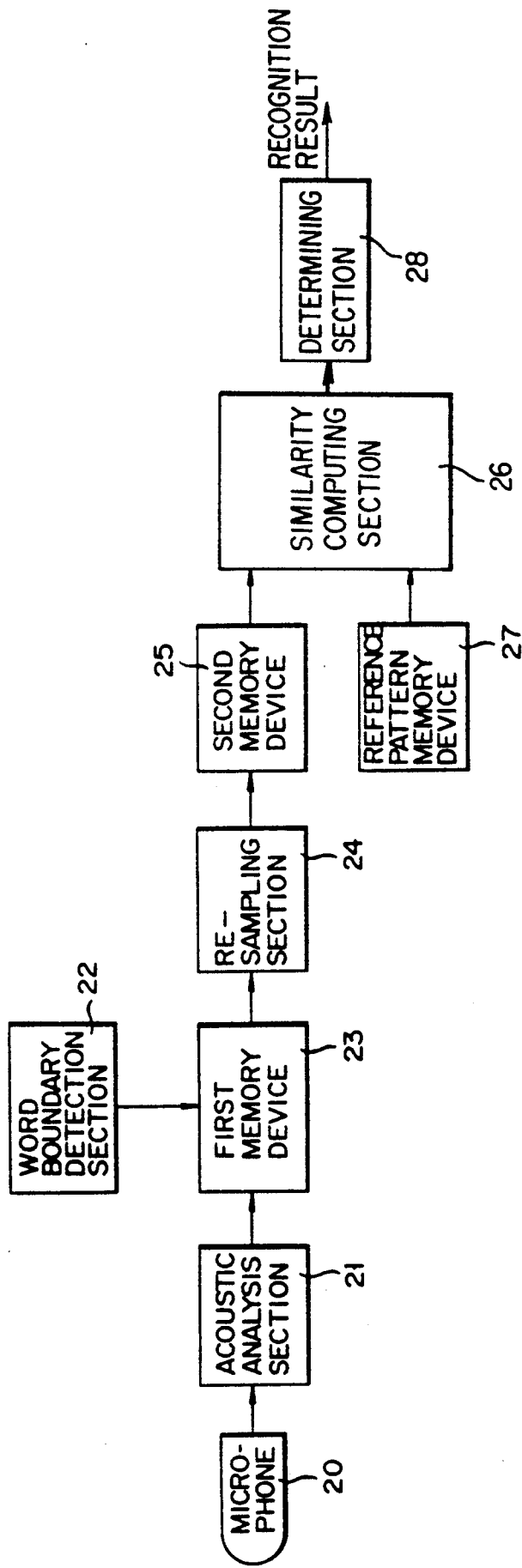
F I G. 2

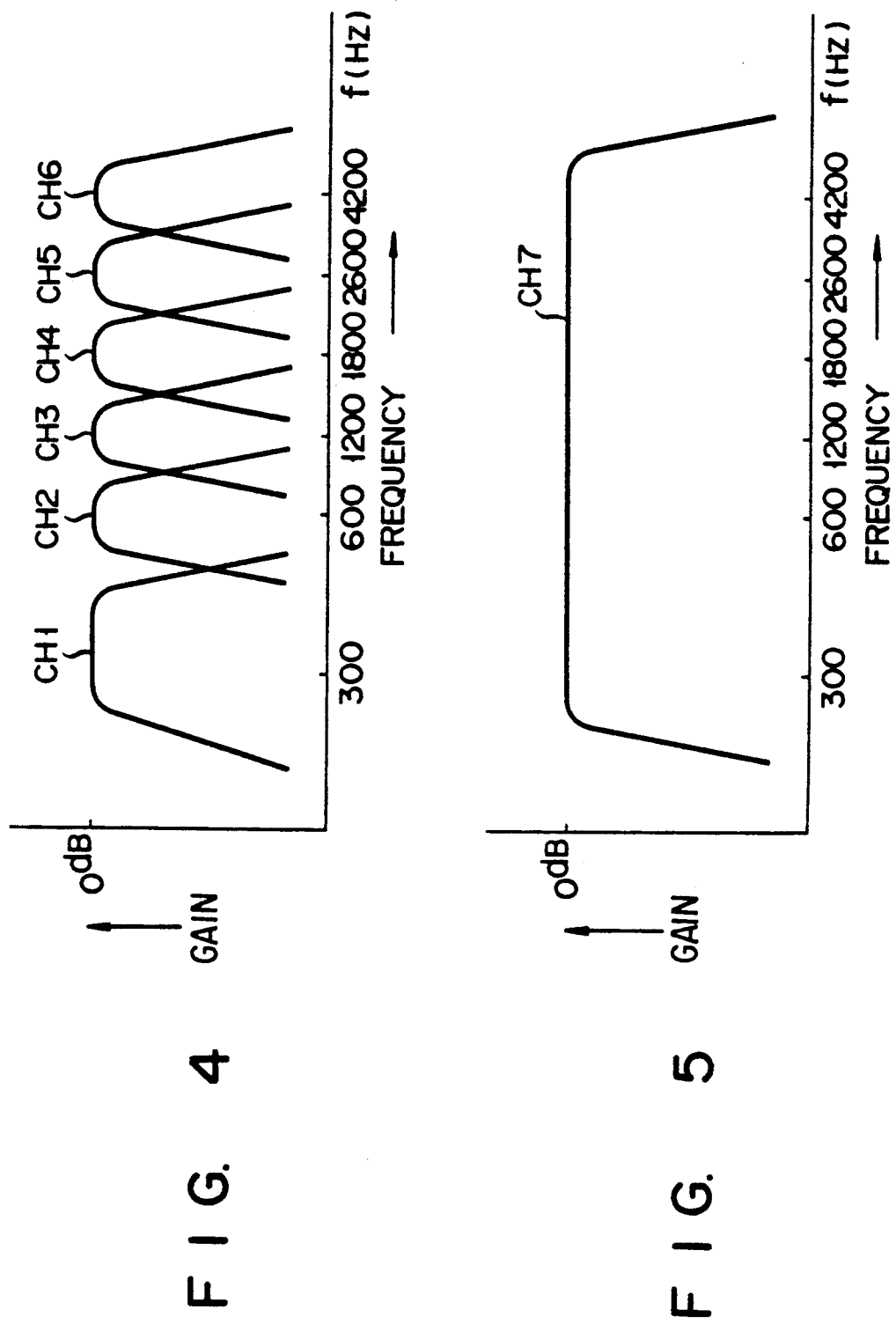

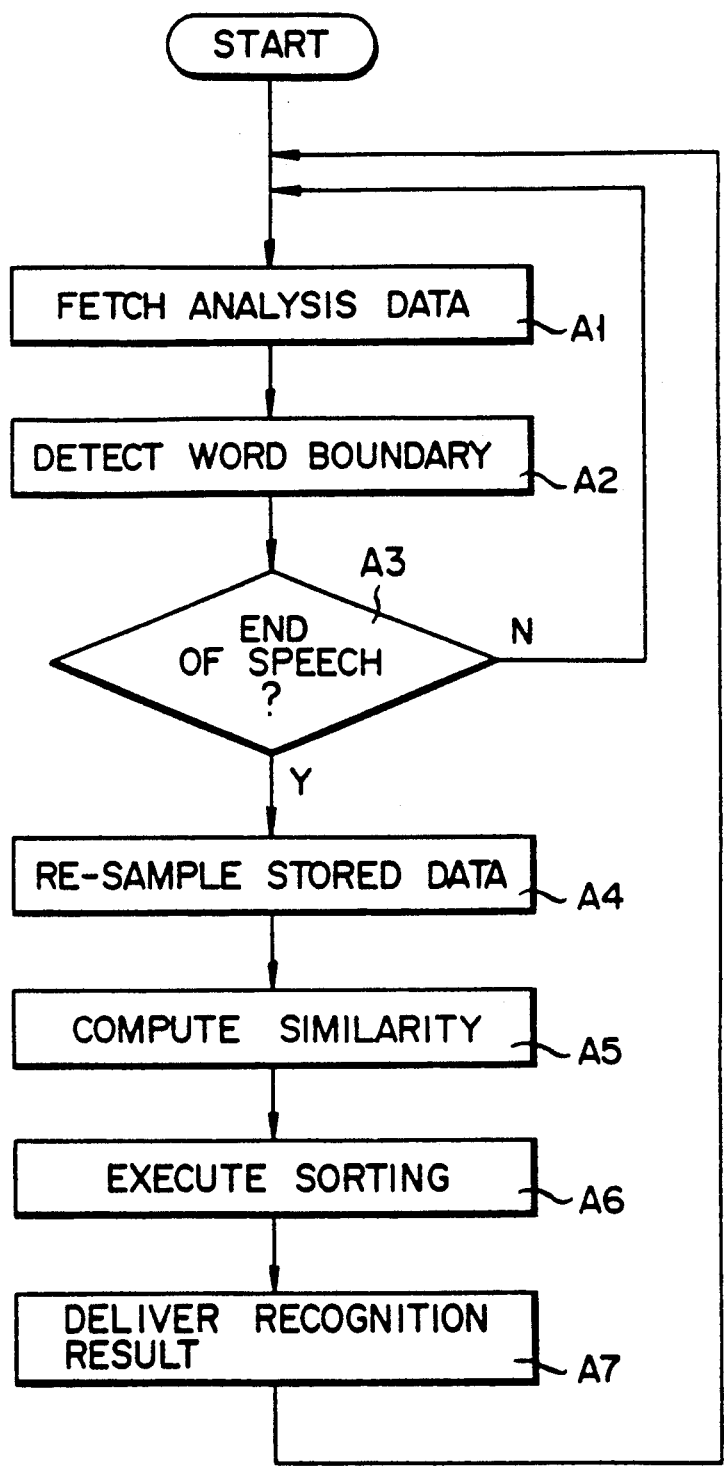
F I G. 9

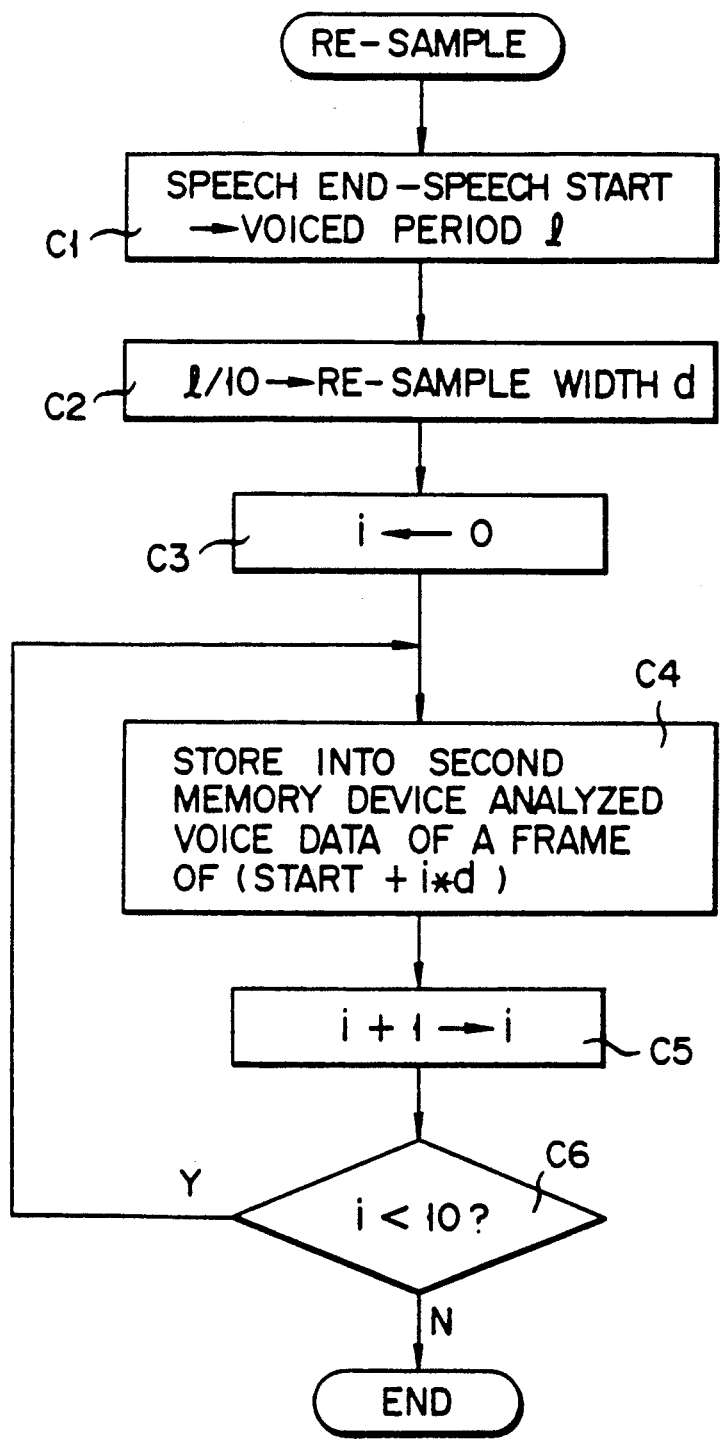
F I G. 11

PATTERN RECOGNITION APPARATUS USING A PLURALITY OF CANDIDATES

This application is a continuation of application Ser. No. 07/349,910, filed May 9, 1989, which is a continuation of application of Ser. No. 07/158,727, filed Feb. 22, 1988, now both abandoned.

BACKGROUND OF THE INVENTION

1. Field of the Invention

The present invention relates to a pattern recognition apparatus for recognizing an input signal and, more particularly, to a pattern recognition apparatus suitable for implementation of an integrated circuit.

2. Description of the Related Art

FIG. 1 is a block diagram showing a conventional arrangement of a speech recognition apparatus as one type of pattern recognition apparatus. A voice signal input by a voice signal input means such as microphone 10 is supplied to acoustic analysis section 11. In section 11, voice features such as frequency spectra are analyzed in units of predetermined frame lengths (normally, several ms to several tens of a ms), and feature data is time-serially extracted. The time-series data is stored in memory device 12, and a word boundary, i.e., start and end points of an effective voice is detected by word boundary detection section 13. The start and end points of the effective word detected by section 13 are supplied to address table 14 of memory device 12. Based on an output address from the address table 14, a data string in a specific voiced period or with a set of word boundaries is fetched from memory device 12 as recognition data, and is supplied to similarity computing section 15.

Reference pattern memory device 16 stores a large number of reference pattern data. Similarity computing section 15 performs similarity computation between these reference pattern data and the data strings fetched from memory device 12. The computation result is supplied to determining section 17, and voice data corresponding to the reference pattern having the maximum similarity is output as a recognition result.

A word period duration when the reference pattern data is stored in memory device 16 does not often coincide with an input word period duration to be recognized. For this reason, when data to be recognized is fetched from memory device 12, the fetched data is time-serially normalized in correspondence with the duration of the reference pattern data, and then, the similarity computation must be performed.

Various time-series normalizing methods of input pattern data have been proposed. However, these methods must use complicated apparatuses, and a high recognition accuracy cannot be obtained.

SUMMARY OF THE INVENTION

It is an object of the present invention to provide a pattern recognition apparatus which can easily time-serially normalize input pattern data with a relatively simple arrangement, and can realize a high recognition accuracy.

A pattern recognition apparatus of the present invention comprises an analysis section for extracting pattern feature data, e.g., frequency spectra, from an input signal for every frame period, a first memory section for sequentially storing feature data output from the analysis section, a data fetch section for fetching and time-serially normalizing data in an effective signal period from the data stored in the first memory section, a second memory section for storing the time-serially normalized data fetched from the data fetch section, a recognition computing section for performing a similarity computation between the time-serially normalized feature data stored in the second memory section and reference pattern data, and a determining section for recognizing and determining the input signal based on the output data from the recognition computing section.

In the pattern recognition apparatus of the present invention, the second memory section which can be accessed only by the recognition computing section is prepared, and data to be recognized fetched by the data fetch section is time-serially normalized and stored in the second memory section. The feature data obtained from the input signal is stored in the first memory section. Therefore, the first memory section can be accessed independently of the recognition computation

BRIEF DESCRIPTION OF THE DRAWINGS

FIG. 2 is a block diagram showing functions of a pattern recognition apparatus according to a first embodiment of the present invention;

FIGS. 4 and 5 are graphs showing functions of a filter bank in an acoustic analysis section shown in FIG. 3;

FIGS. 9 to 12 are flow charts showing the operation of the embodiment shown in FIG. 3;

DETAILED DESCRIPTION OF THE PREFERRED EMBODIMENTS

Figure 1:
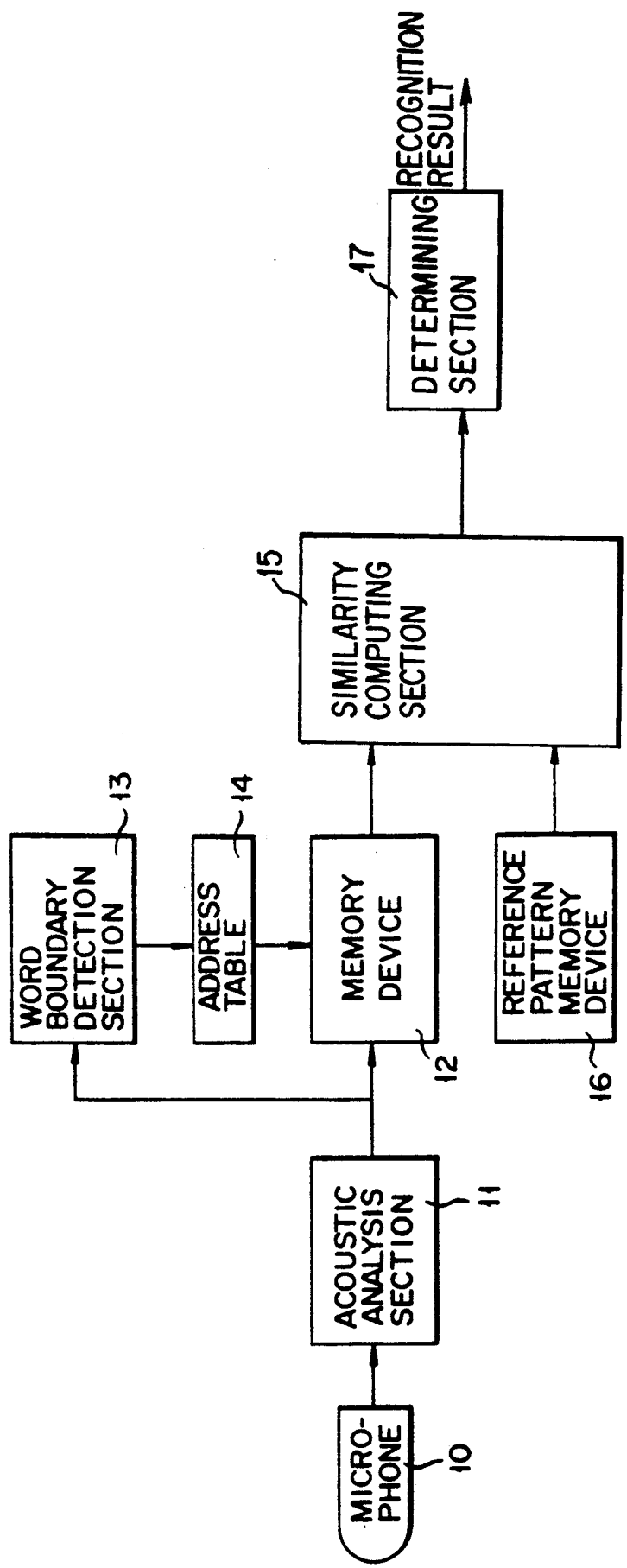
FIG. 1 is a block diagram showing an arrangement of a conventional speech recognition apparatus.

Embodiments of the present invention will be described with reference to the accompanying drawings.

FIG. 2 is a view for explaining functions of an embodiment of a speech recognition apparatus to which the present invention is applied. In FIG. 2, an analog voice signal input from microphone 20 is supplied to acoustic analysis section 21. Acoustic analysis section 21 extracts digital feature data from the input voice signal using a combination of a filter bank including a serially connected rectifier, an analog band-pass filter and a low-pass filter and an analog-to-digital (A/D) converter for converting the output from the filter bank into digital data. A word boundary of an input voice is detected from the extracted feature data by word boundary detection section 22 and is stored in first memory device 23.

As one detection method in word boundary detection section 22, the following method is known. Energy components of input voice data are extracted by acoustic analysis section 21 using a broad-band band-pass filter. When the energy components exceed a predetermined threshold value for a predetermined period of time, a position where the energy components first exceed the threshold value is determined as a starting point or a start frame. When the energy components decrease below the threshold value for a predetermined period of time, a position where the energy components first decrease below the threshold value is determined as an end point or an end frame of a word. In another detection method, high and low threshold values are determined, and when energy components reach the high threshold value from the low threshold value within a predetermined period of time, the frame corresponding to the low threshold value is determined as a start frame of a word.

The feature data of input voice data obtained by detecting the word boundary is normally time-serially sampled at a given sampling frequency. Assuming that the number of samples is given by N frames, this number N changes depending on the word boundary. The N frame data is normalized along with the time base to obtain M frame data having a fixed duration. As one method, re-sampling is performed. For example, a sample of the $(1+i(N-1)/(M-1))$th frame is fetched (where i=0 to M−1). The feature data stored in first memory device 23 is re-sampled by re-sampling section 24, and is normalized along the time base. Then, the normalized data is transferred to second memory device 25 and is stored therein.

The data string stored in second memory device 25 is fetched as data to be recognized, and is supplied to similarity computing section 26. The similarity computation can be executed by known methods, for example, as disclosed in U.S. Pat. No. 4,624,011.

Reference pattern memory device 27 stores a large number of reference pattern data. Similarity computing section 26 performs the similarity computation between these reference pattern data and the data string fetched from second memory device 25. The computation result or similarity data is supplied to determining section 28, and a number of words corresponding to the reference pattern having the maximum similarity are determined. The determined number is output as a recognition result.

In the apparatus of this embodiment, second memory device 25, separate from first memory device 23 for storing data to be recognized, is accessed to read out data for similarity computation. Therefore, no complicated address computation is required, and data can be fetched only by sequentially addressing second memory device 25. When similarity computing section 26 accesses data to be recognized, only a read control signal and an address count-up signal are required. For this reason, the arrangement of a control circuit can be simplified, and the number of hardware components for an integrated circuit can be reduced.

The re-sampled data stored in second memory device 25 requires a capacity, of 1/10 or less of the feature data stored in first memory device 23. For this reason, only one first memory device 23 need be prepared, even when a plurality of similarity computing sections are required in the case wherein word boundary detection is performed based on a plurality of algorithms in order to detect a plurality of word boundaries, or wherein a plurality of periods are detected to obtain a plurality of candidates based on a specific algorithm.

In practice, in view of an occupation area on a chip when the apparatus of this embodiment is integrated on a chip, the area of second memory device 25 is 0.1 and that of similarity computing section 26 is 0.3 when the area of first memory device 23 is assumed to be 1. Therefore, even when a plurality of similarity computing sections are prepared on the chip, only one first memory device 23 which occupies a large area need be prepared, thus advantageously reducing a chip area.

Figure 3:
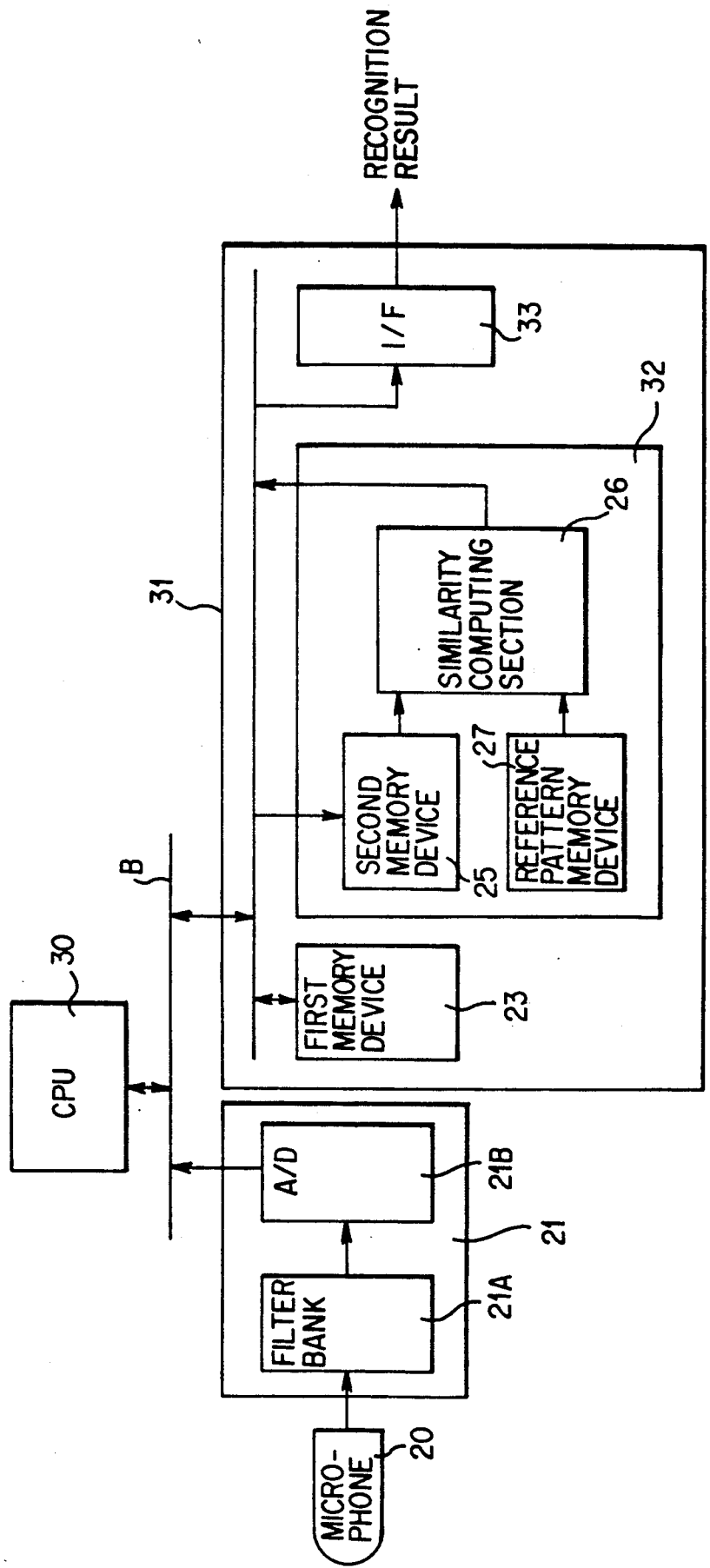
FIG. 3 is a block diagram showing the arrangement of the embodiment shown in FIG. 2.

FIG. 3 is a block diagram showing an arrangement of the apparatus of this embodiment for realizing the functions shown in FIG. 2.

The same reference numerals in FIG. 3 denote the corresponding portions as in FIG. 2. Acoustic analysis section 21 may be constituted by an analog processor for analyzing frequency components, energy components, and so forth in a voice signal input through microphone 20. Analog processor 21 incorporates a filter bank 21A and A/D converter 21B, and extracts predetermined acoustic features from the input voice signal upon instruction from CPU 30 through bus B.

Reference numeral 31 denotes a digital processor which incorporates first memory device 23, recognition computing section 32, and external interface section (I/F) 33.

Recognition computing section 32 incorporates similarity computing section 26, second memory device 25, and reference pattern memory device 27. Of the functions shown in FIG. 2, those corresponding to word boundary detecting section 22, re-sampling section 24, and determining section 28 are realized by CPU 30.

Filter bank 21A in acoustic analysis section 21 comprises 7-channel band-pass filters. The band-pass filter rectifiers and low-pass filters have characteristics shown in FIGS. 4 and 5. The rectifier rectifies the output of the band-pass filter and delvers the rectified signal to the succeeding low-pass filter which allows a signal of less than 50 Hz to pass therethrough. Frequency components included in a human voice are extracted using 6-channel (CH1 to CH6) band-pass filters, as shown in FIG. 4, and the extracted data is used for the similarity computation as input voice feature data. The 7th band-pass filter passes a signal having a main frequency range, e.g., 50 Hz to 5,000 Hz included in the human voice. An output extracted by the 7th-channel (CH7) band-pass filter is used for detecting energy components of input voice data at word boundary detection section 22 shown in FIG. 2.

The 1st to 7th-channel filter outputs extracted by filter bank 21A are supplied to A/D converter 21B, and are subjected to non-linear conversion such as log-conversion. Thereafter, the resultant data is output as 8-bit digital feature data for each channel. 1-byte dummy data is added to 7-channel 8-bit feature data (8 (bit)×7 (channel)), and the resultant 8-byte data is treated as one-frame data.

Figure 6:
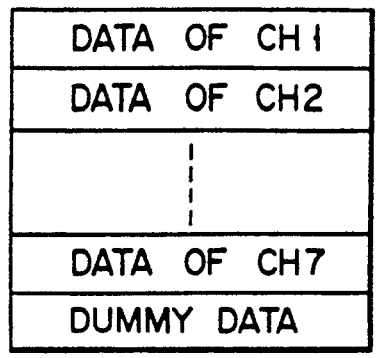
FIG. 6 shows a data format in one frame.
Figure 7:
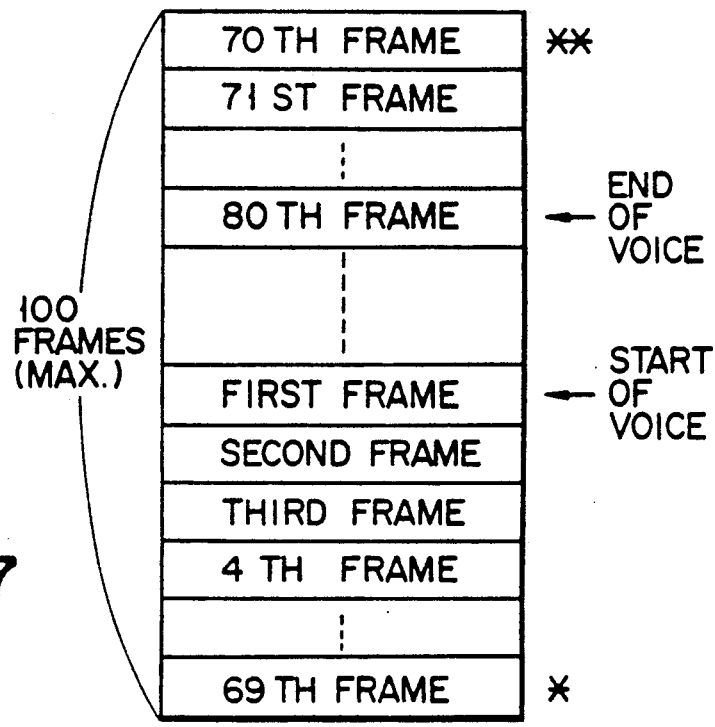
FIG. 7 shows a data format in a first memory device.
Figure 8:
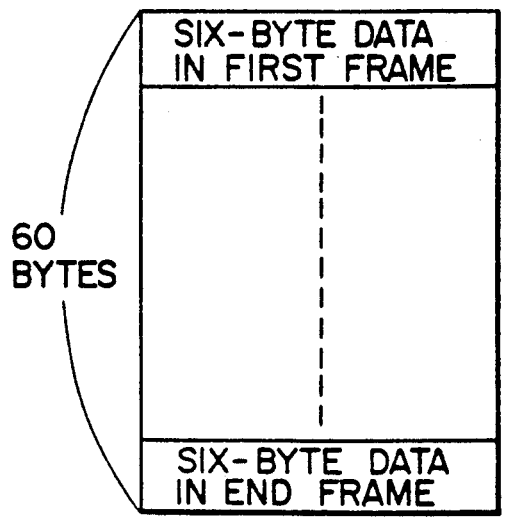
FIG. 8 shows a data format in a second memory device.
Figure 10:
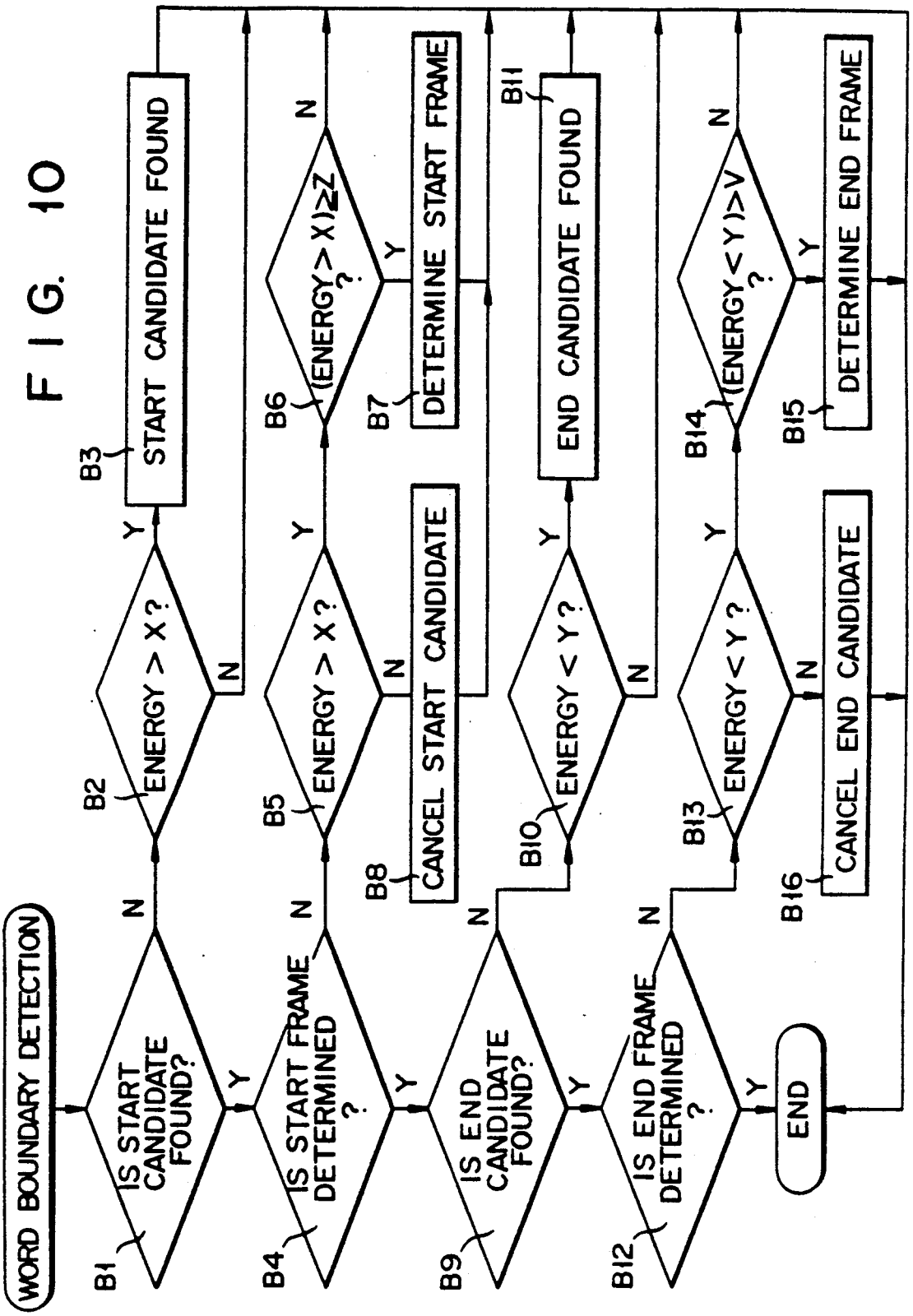

Each frame data output from acoustic analysis section 21 is sampled by CPU 30 every 20 ms, and is sequentially stored in first memory device 23 through bus B. FIG. 6 shows the 8-byte data format for one frame. Such frame data is stored in first memory device 23 having a memory capacity corresponding to a maximum of 100 frames, as shown in FIG. 7. Storage data shown in FIG. 7 represents a state after word boundary detection. The first frame serves as voice start data point, and the 80th frame serves as voice end data. First memory device 23 has a ring structure, and the address order of the start and end points is often reversed. In the case of FIG. 7, the 69th frame indicated by * is followed by the 70th frame indicated by **. For this reason, theoretically, data of start to end frames can be treated as continuous data.

The number of frames of the feature data stored in first memory device 23 varies depending on a duration of voice data. The frame data included in one word period in first memory device 23 is read out in a predetermined cycle (sampling frequency) under the control of CPU 30, and is sequentially stored in 60-byte second memory device 25 from the first frame. In this case, of the frame data, 6-byte data (CH1 to CH6 data) is stored in second memory device 25 as feature data for the similarity computation. Memory device 25 always stores 60-byte data, and performs normalization along the time base.

The operation of the embodiment shown in FIG. 3 will be described with reference to the flow charts shown in FIGS. 9 to 12.

With the above arrangement, CPU 30 causes first memory device 23 in digital processor 31 to store feature data obtained by analog processor 21 in step A1 shown in FIG. 9. CPU 30 also performs word boundary detection control using energy data of CH7 shown in FIG. 5 in step A2. For example, CPU 30 compares the output level of the CH7 band-pass filter with a predetermined value, and detects a word boundary defined by start and end points obtained when the output level exceeds or falls below the predetermined value. After voice input is completed, YES is obtained in step A3, and re-sampling control is performed in step A4. CPU 30 transfers re-sampled data to second memory device 25.

CPU 30 supplies a computation start instruction to recognition computing section 32 of digital processor 31. Recognition computing section 32 performs a similarity computation for all the voice patterns, e.g., syllable patterns stored in reference pattern memory device 27 using similarity computing section 26 in step A5. Each time a computation for each word is completed, section 32 supplies a read request signal to CPU 30 in step A6 so as to request CPU 30 to read out the similarity computation results.

When CPU 30 fetches similarity computation results for all the words, CPU 30 sends out the word number than X, the flow advances to step B8, and the start candidate is canceled.

If the start is determined in step B7, the flow advances from step B4 to B9 to find an end candidate. If NO in step B9, it is checked in step B10 if the obtained energy level is smaller than predetermined value Y (X=Y is allowable). If YES in step B10, the flow advances to step B11. In step B11, a flag indicating that the end candidate is found is set.

If the end candidate is found, the flow advances from step B9 to B12 to check if the end is determined. If NO in step B12, it is checked in step B13 if the energy level is lower than Y (X=Y is also allowable). If YES in step B13, the flow advances to step B14. It is checked in step B14 if V frames (e.g., V=10) having a level lower than Y are continued. If YES in step B14, the flow advances to step B15 and an end of the input word boundary is determined. If it is determined in step B13 that the energy level is larger than Y, the flow advances to step B16, and the end candidate is canceled.

If the end is determined in step B15, YES is obtained in step B12, and the flow is ended.

Re-sampling step A4 in FIG. 9 will be described in more detail with reference to FIG. 11. In step C1, word boundary period l is obtained by performing a computation l=voice end frame−voice start frame. Resultant voiced period l is divided into 10 sections in step C2, and value 1/10 is obtained as re-sample width d. In step C3, i=0 is written in the content of a counter.

In step C4, feature data of an (i.d)th frame (i=1) from the frame number of the start is read out from first memory device 23, and is stored in second memory device 25. The flow advances to step C5, and value i is incremented by +1. The incremented value is written in an i register. It is checked in step C6 if i is smaller than 10. If YES in step C6, the flow returns to step C4, and the feature data of the next frame is stored in second memory device 25. Similarly, the frame data is sequentially stored in second memory device 25. When i=10, NO is obtained in step C6, and re-sampling is ended.

Figure 12:
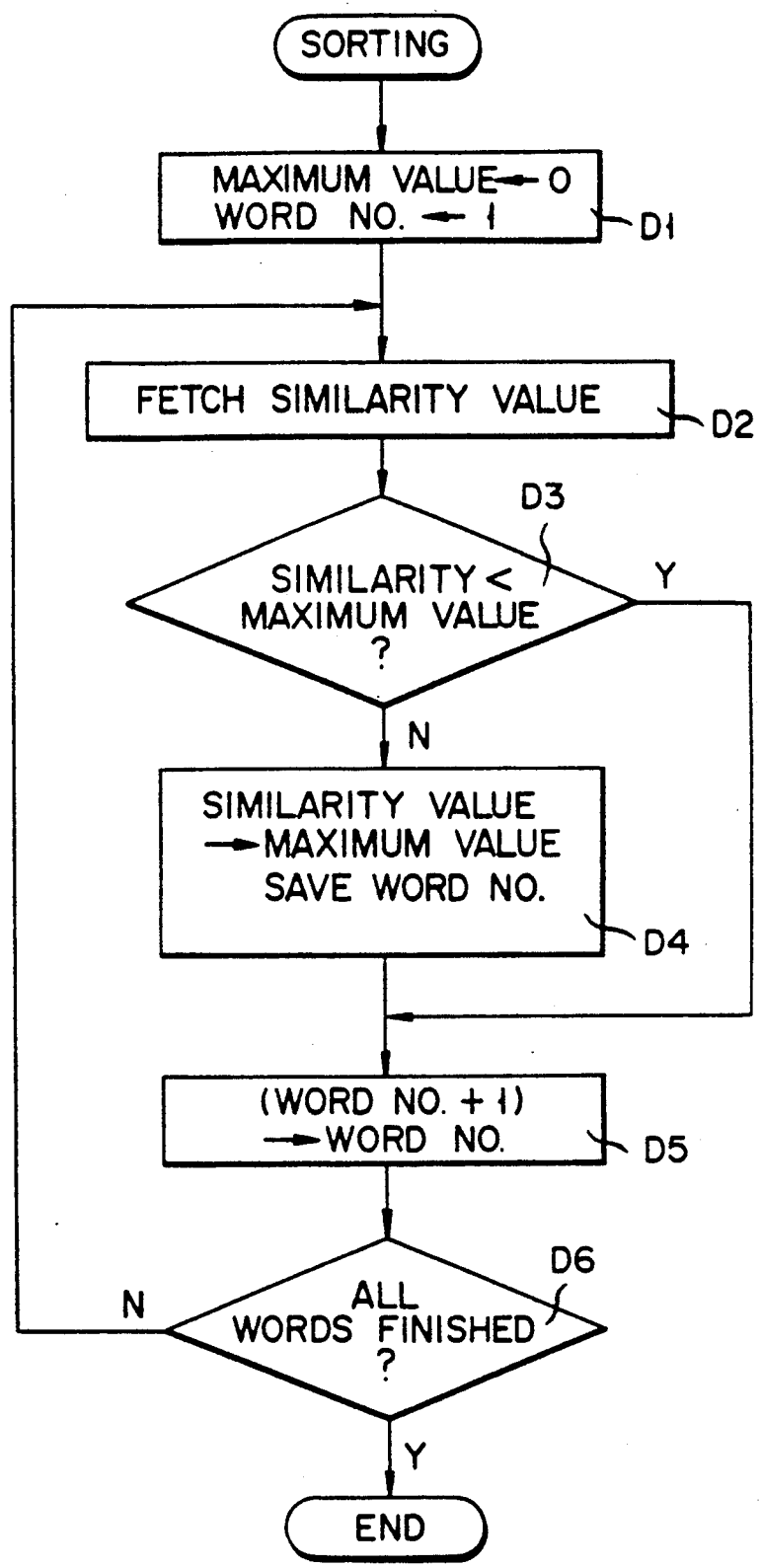

FIG. 12 is a flow chart showing the content of sorting step A6 in FIG. 9 in detail. In step D1, 0 is set as a maximum similarity for a word to be recognized, and number "1" of the reference word pattern is set. Computing section 26 executes similarity computation of pattern data read out from second memory device 25 and reference pattern memory device 27 under the control of CPU 30. In step D2, CPU 30 fetches the resultant similarities. The computed similarity is compared with preset maximum value in step D3. If the computed similarity is larger than a reset maximum value, NO is obtained in step D3, and the flow advances to step D4. The similarity larger than the preset maximum value is fetched as the latest maximum value, and the corresponding word number is stored in CPU 30 as a recognition result.

In step D5, a word number is incremented by +1, and it is then checked in step D6 if the operations in steps D2 to D5 are completed for all the reference words. Therefore, when the operation shown in FIG. 12 is completed for all the words, the word number providing the maximum similarity is output as recognition results from I/F 33.

More specifically, in the apparatus of this embodiment, CPU 30 serves as both a control circuit for controlling take entire operation and determining section 28 in FIG. 2.

Figure 13:
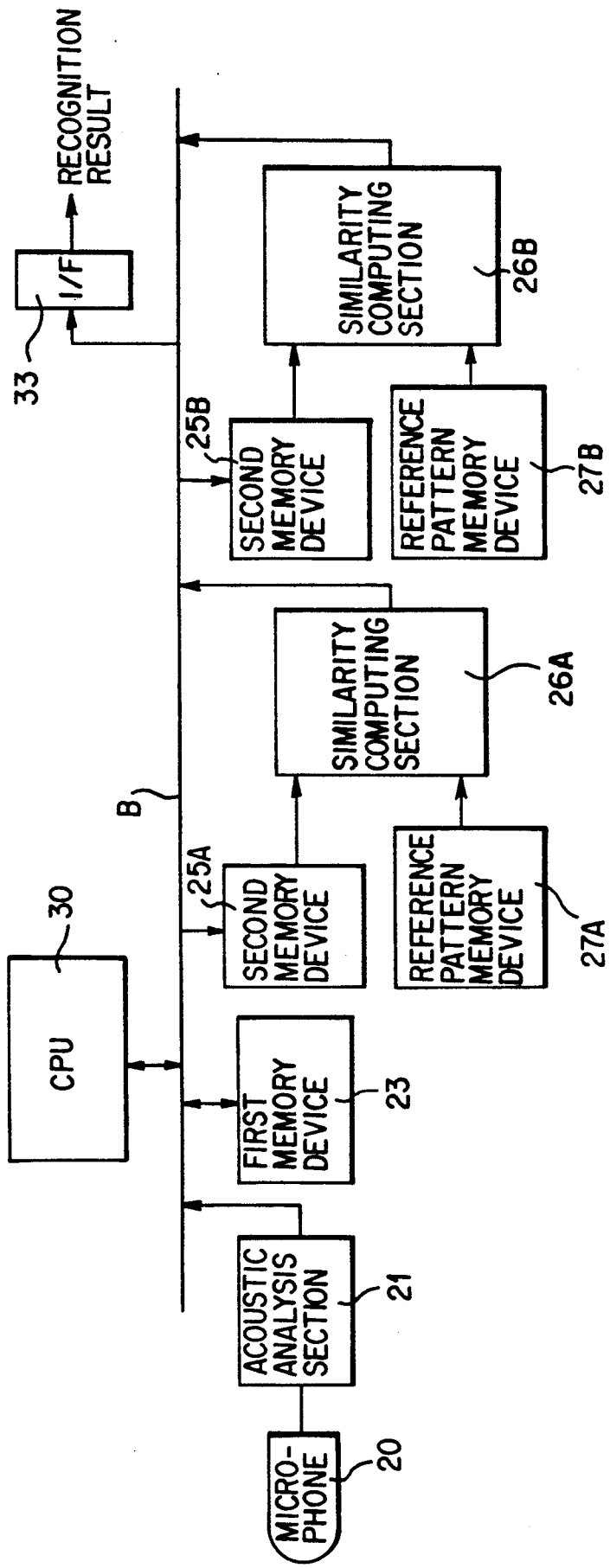
FIG. 13 is a block diagram showing an arrangement according to a second embodiment of the present invention.

FIG. 13 is a block diagram showing an arrangement of an apparatus according to a second embodiment of the present invention. In this second embodiment, the present invention is applied to a speech recognition apparatus having two recognition computing sections. Reference numeral 21 denotes an analog processor, incorporating a filter bank and an A/D converter, for analyzing a voice signal input by a voice signal in put means such as microphone 20. Reference numeral 30 denotes a CPU; 23, a first memory device; 26A and 26B, similarity computing sections; 25A and 25B, second memory devices; 27A and 27B, reference pattern memory devices; and 33, an external interface section.

CPU 30 selects a plurality (in this case, two) of start and end points when a word boundary period is detected from feature data stored in first memory device 23. CPU 30 re-samples and transfers the data to second memory devices 25A and 25B. After the transfer operation is completed, CPU 30 supplies a recognition computation start instruction to similarity computing sections 26A and 26B, and then stands by until a computation for one word is completed. The similarity computation for one word is normally completed in about 3 ms. However, since the instruction execution speed of CPU 30 is fast, i.e., 2 $\mu$s, the similarity computations are performed in parallel in two similarity computing sections 26A and 26B, and all the data can be processed without losing a computation result.

When reference pattern memory devices 27A and 27B store identical contents, the maximum one of a plurality of similarity computation results obtained for a plurality of word boundaries is determined to be a similarity for a word. Therefore, word boundary detection error can be eliminated, and high recognition accuracy is obtained.

When reference pattern memory devices 27A and 27B store different contents, the reference pattern data number is doubled as compared to a case wherein only one reference pattern memory device is provided, and a similarity of an input voice signal having a large number of vocabulary words can be obtained at a speed twice that of the apparatus shown in FIG. 3.

In the apparatus of this embodiment, the similarity computation is performed in two similarity computing sections 26A and 26B. Three or more similarity computing sections can be prepared to obtain higher recognition efficiency or to obtain a similarity at high speed.

Figure 14:
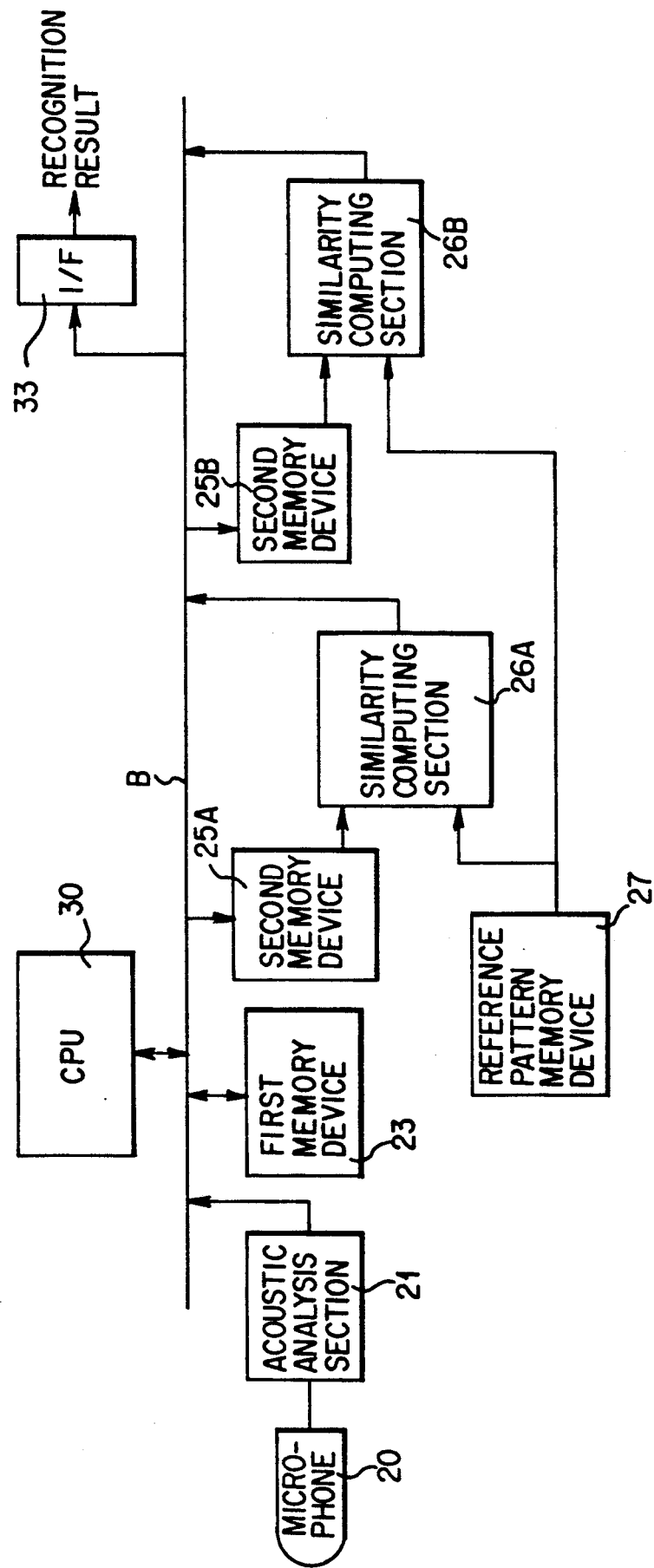
FIG. 14 is a block diagram showing an arrangement according to a third embodiment of the present invention.

FIG. 14 is a block diagram showing an arrangement of an apparatus according to a third embodiment of the present invention. In the apparatus of this embodiment, when two similarity computing sections 26A and 26B are provided, one reference pattern memory device 27 is provided, and is commonly used by different similarity computing sections. In this embodiment, input voices having a larger number of vocabulary words cannot be recognized at high speed. However, word boundary detection precision can be improved with a small number of hardware components, and a high recognition efficiency can be obtained.

According to the present invention as described above, a pattern recognition apparatus which can provide a high recognition efficiency and can be constituted with a smaller number of hardware components can be provided.

What is claimed is:

1. A pattern recognition apparatus for recognizing a pattern of an input signal, the apparatus comprising:
    means for extracting pattern feature data representing pattern features of the input signal, and for detecting an effective signal duration of the input signal;
    first memory means for storing the extracted pattern feature data;
    means for reading out selected ones of the pattern feature data stored in said first memory means, said reading out means including means for defining a plurality of unique candidate durations denoting a plurality of different input signal durations similar to the effective signal duration for the pattern feature data stored in said first memory means;
    second memory means having a plurality of memory units for storing the selected pattern feature data read out by said reading out means;
    means for storing reference pattern data;
    similarity computing means including a plurality of similarity computing sections for computing similarities between the selected pattern feature data read out from said second memory means and said reference pattern data read out from said reference pattern data storing means; and
    means for recognizing the pattern of the input signal based on the computed similarities.

2. An apparatus according to claim 1, wherein:
    said extracting means includes first filter means for extracting frequency spectrum data of the input signal and second filter means for extracting energy level data of the input signal;
    said first memory means stores the frequency spectrum data from said first filter means; and
    said candidate duration defining means includes means for defining the unique candidate durations in accordance with the energy level data from said second filter means.

3. An apparatus according to claim 2, wherein:
    the input signal is a voice signal;
    the reference pattern data comprises data representing a reference voice pattern; and
    said pattern recognizing means includes means for determining the input voice signal based on the computed similarities.

4. An apparatus according to claim 1, wherein said extracting means includes:
    means for sampling the input signal with a predetermined frame cycle;
    a filter bank for filtering, using a plurality of frequency channels, said sampled input signal obtained by sampling the input signal in the predetermined frame cycle; and
    means for analog-to-analog converting the output from said filter bank and forming frame data.

5. An apparatus according to claim 1, wherein said first memory means has a ring structure.

6. An apparatus according to claim 1, wherein the reference pattern data storing means includes a plurality of reference pattern data memories corresponding to said plurality of similarity computing sections.

7. An apparatus according to claim 1, wherein the reference pattern data storing means includes a single reference pattern data memory coupled to said plurality of memory units.

8. A pattern recognition apparatus for recognizing a pattern of an input signal, the apparatus comprising:
    extracting means for extracting pattern feature data representative of the pattern from the input signal;
    first memory means operatively coupled to the extracting means for storing the extracted pattern feature data;
    candidate selection means operatively coupled to the first memory means for selecting a plurality of unique candidate signal durations corresponding to a duration of the input signal;
    second memory means operatively coupled to the first memory means and to the candidate selection means for storing selected ones of the pattern feature data in accordance with the candidate signal durations;
    means for storing reference pattern data;
    similarity computing means operatively coupled to the second memory means and to the reference pattern data storing means for computing a similarity between the selected pattern feature data and the reference pattern data; and
    means operatively coupled to the similarity computing means for recognizing the pattern of the input signal based on the computed similarity.

9. An apparatus according to claim 8, wherein:
    the input signal includes frequency spectrum data and energy level data;
    said extracting means includes first filter means for extracting the frequency spectrum data and second filter means for extracting the energy level data;
    said first memory means stores the frequency spectrum data; and
    said candidate selection means includes means for selecting the durations for the candidate pattern feature data in accordance with the energy level data.

10. An apparatus according to claim 9, wherein:
the input signal comprises a voice signal having a voice pattern;
the reference pattern data represent a plurality of reference voice patterns; and
said recognizing means includes means for matching the voice pattern to a selected one of the reference voice patterns based on the computed similarity.

11. An apparatus according to claim 8, wherein said extracting means includes:
a filter bank including a plurality of frequency channels for filtering and sampling the input signal in a predetermined frame cycle to generate a filtered input signal; and
analog-to-analog converting means operatively coupled to the filter bank for digitizing the filtered input signal to form frame data.

12. An apparatus according to claim 8, wherein said first memory means has a ring structure.

13. An apparatus according to claim 8, wherein:
said second memory means includes a plurality of memory units, each of the memory units storing selected frame data of a portion of the selected pattern feature data corresponding to one of the candidate signal durations; and
said similarity computing means includes a plurality of similarity computing sections operatively coupled to respective and corresponding ones of said memory units, each of said similarity computing sections computing a similarity between the frame data of the selected pattern feature data of a corresponding memory unit and the reference pattern data.

14. An apparatus according to claim 13, wherein the second memory means includes a plurality of reference pattern memories operatively coupled to respective and corresponding ones of said similarity computing sections, each of said similarity computing sections computing a similarity between the frame data of the selected feature data of a corresponding memory unit and the reference pattern data of a corresponding reference pattern memory.

15. An apparatus according to claim 13, wherein said second memory means further includes a single reference pattern memory operatively coupled to said memory units for storing the reference pattern data and the communicating the reference pattern data to the memory units.

* * * * *